United States Patent [19]
Galt et al.

[11] Patent Number: 5,394,263
[45] Date of Patent: Feb. 28, 1995

[54] METHOD AND APPARATUS FOR ATTENUATING A LIGHT BEAM

[75] Inventors: John Galt; James Pearman, both of Glendale, Calif.

[73] Assignee: Sony Electronics, Inc., Park Ridge, N.J.

[21] Appl. No.: 54,557

[22] Filed: Apr. 28, 1993

[51] Int. Cl.⁶ .............................................. G02B 26/02
[52] U.S. Cl. .................... 359/227; 359/234; 359/236; 348/362; 250/229
[58] Field of Search ................ 359/227, 230, 234–236, 359/885, 889, 892, 894, 900; 348/362–363, 367–368, 832, 835; 354/410, 456, 463, 274; 250/229–233

[56] References Cited

U.S. PATENT DOCUMENTS

| | | | |
|---|---|---|---|
| 4,193,676 | 3/1980 | Ueda et al. | 359/227 |
| 4,943,815 | 7/1990 | Aldrich et al. | 359/227 |
| 5,087,122 | 2/1992 | Ostrander et al. | 359/234 |

*Primary Examiner*—Loha Ben
*Assistant Examiner*—James Phan
*Attorney, Agent, or Firm*—Irell & Manella

[57] ABSTRACT

A light valve for attenuating a collimated light beam contains a focusing lens, a light vane and motor control. The focusing lens contains a focal length and lens diameter. The focusing lens focuses a collimated light beam to generate a light cone such that the dimensions of the light cone are based on the diameter and focal length of the focusing lens. The light vane deflects light within the light cone. The motor is controlled to position the light vane to attenuate the light within the light cone by placing the light vane in at least one position ranging from a zero stop attenuation position to a full stop attenuation position. For a single degree of light vane rotation into the light cone, the light beams is attenuated by three percent. In the zero stop position, the light vane is parallel to an edge of the light cone so that no light is attenuation. In the full stop position, the light vane is located thirty degrees, relative to the zero stop position, into the light cone.

15 Claims, 12 Drawing Sheets

METHOD AND APPARATUS FOR ATTENUATING A LIGHT BEAM

BACKGROUND OF THE INVENTION

1. Field of the Invention

The present invention relates to the field of image processing systems, and more particularly, to conversion of motion picture film to a high definition video format.

2. Art Background

Telecine systems have been developed for converting motion picture film images into conventional NTSC and PAL video signal formats. Traditionally, these telecine systems were developed to convert the motion picture film images to television signals for broadcast. Prior to the emergence of solid state imagers, telecine equipment was constructed using camera tubes or flying-spot scanners. The flying-spot scanner generates a video signal from film by scanning the film image with a very small spot of light and collecting the resulting transmitted light at a photo cell. Although an effective means to convert film to NTSC or PAL video signal formats, flying spot scanners generate video signals with limited resolution. Therefore, flying spot scanners are not an effective means for film to high definition video conversion. As equipment such as telecines are developed to facilitate the interface between high definition video and film, it is important to address all aspects of the system interface to provide quality film to high definition video conversion.

In general, telecine systems generate light to create optical film images from devices known as lamphouses. Traditionally, lamphouses for telecines and optical printers utilize specular light sources. The specular light sources, in conjunction with reflector and condensing lens types, are typified by high efficiency and contrast. Although specular light sources and the associated optics exhibit high efficiency and contrast, the specular light sources require critical optical alignment of lamp filament, reflector and condensing lenses. This critical alignment also varies with magnification further emphasizing the need for precise optical alignment. Additionally, a specular source increases the visibility of surface abrasions on the film.

The color television cameras used in traditional telecine systems typically have spectral sensitivities and pre-amplifier gain characteristics optimized for a 2900° K. to 3200° K. light source. These light sources, such as tungsten light sources often used in television studios, are appropriate for the spectral sensitivities of the Vidicon type detectors. However, a high definition charged coupled device (CCD) camera has different spectral characteristics than the Vidicon type detectors. The spectral sensitivity of present CCD detectors is characterized by poor blue sensitivity and excellent red sensitivity into the infra-red region. Therefore, in telecine systems utilizing CCD detectors, it is desirable to provide a light source in the lamphouse that provides efficient alternatives to traditional tungsten light sources by exhibiting spectral bandwidths and color temperatures maximized for the CCD detector.

A television camera often contains an optic prism to separate the input polychromatic optical image into its three constituent monochromatic components of red, green and blue (RGB). Existing color television camera prism designs make a very efficient use of the available light spectrum. Typical prism designs result in greater than 80% of the spectral bandpass being directed to the appropriate red, green or blue detector. Unfortunately, the separation into the RGB components in the prism results in a certain amount of crosstalk between the RGB detectors. In order to reduce or eliminate the effects of the crosstalk among the CCD detectors, a matrix is required in the television camera signal processing circuit. Although the matrix helps to reduce or eliminate the CCD detector crosstalk, it results in a reduction of the signal to noise performance of the system. Therefore, it is desirable to generate a light source that minimizes the crosstalk among CCD detectors so as to reduce or eliminate the need for the crosstalk matrix.

Color film emulsions suffer from a similar crosstalk problem. In fact, the problem is more severe since the dyes generated in the film emulsion have considerably inferior bandpass characteristics to that of the interference filters employed in television camera prisms. However, color negative films employ a very efficient photo-chemical matrix or "dye masking" system which results in excellent color response which enables color print film colorimetry to exceed the present display colorimetry of high definition video signals (HDVS). When color film emulsions are the originating source for HDVS images, an appropriate color separation system is required which is substantially different from that of a color television camera imaging the real world. The most important characteristic of this separation system is that it creates color separations based on the primary analysis characteristics of the film emulsion while minimizing electrical crosstalk, and therefore reducing the magnitude of matrix coefficients.

An appropriately designed lamphouse can contribute to overall system performance by providing optimal conditions to realize best signal to noise performance. Therefore, it is desirable to create a lamp house that provides a light source designed to compliment the scanner spectral characteristics, minimize crosstalk among the color channels, and provide an even light field which can reduce shading compensation.

Conventional motion picture film consists of frame images which are commonly displayed sequentially at a rate of 24 frames per second (fps). However, the standard video frame rate is 25 video fps for PAL format video, 29.97 video fps for the NTSC video format and 30 video fps for the SMPTE-240M high definition video format. Therefore, to convert motion picture film images into video image signals, frame conversion is required. In PAL systems, it is a universal practice to reproduce the 24 frame rate film at 25 fps. In practice, this is acceptable because the discrepancy is only 4.17%, and the increase in pitch and reduction in running time of the film is acceptable. In the case of NTSC and high definition video, the discrepancy of 6 frames per second is a 25% difference, and therefore, reproducing the 24 fps motion picture film would be intolerable. To compensate for the frame rate mismatch, a technique commonly referred to as 3-2 pull down in used to generate higher video frame rates.

Typically, the 3-2 video frames are generated by holding the film in a projector gate to permit two field exposures or three field exposures to occur. A pulldown mechanism, which transports the film into the projector gate, delivers the film at uneven periods in order to generate either the two or three exposures. In addition, the pulldown mechanisms used to achieve the 3-2 film frame to video frame conversion are edge guided. The edge guided system does not provide accurate image registration. While edge guiding may provide acceptable results for NTSC and PAL video conversion, a highly accurate positioning pulldown mechanism is required for high definition video. Therefore, it is desirable to generate the 3-2 pulldown film to video frame conversion rate with the same high precision frame placement system in which the original image was created on the camera.

SUMMARY OF THE INVENTION

A real-time telecine system for converting motion picture film to high definition video is disclosed. The telecine system contains a control unit comprising a database which provides complete control over all parameters associated with the film to high definition video conversion. In a preferred embodiment of the present invention, the telecine system converts motion picture film images displayed at 24 frames per second to SMPTE-240M high definition video displayed at 30 frames per second. In general, the telecine system comprises a film transport sub-system, camera sub-system, rotating shutter and lamphouse. To convert a motion picture film to high definition video, the motion picture film is advanced, by the film transport sub-system, a single frame at a time during a pulldown period, and the film is held steady during a register period.

The lamphouse contains three monochromatic light sources wherein each light source is controlled independently by the control unit. The independent control of each monochromatic light source permits variable light intensity outputs from each light source. To expose a film frame to the camera sub-system, the three monochromatic light sources are integrated to generate a single diffused light source. The diffused light illuminates the film frame to generate an optical film image, and the rotating shutter permits exposure of the optical film image to the camera sub-system in a 3-2 pulldown arrangement. The camera sub-system contains a correction lens and a high definition (HD) camera. The optical film image is projected onto a mirror which transfers the optical image to the correction lens. The correction lens performs optical corrections on the optical film image caused by aberrations from an optical prism in the HD camera. The HD camera comprises three high definition charged coupled device (CCD) arrays for image detection.

Each of the three monochromatic light sources contains a light valve. The control unit controls the light intensity output for each of the three monochromatic light sources through control of the light valve. The light valve contains a focusing lens, a light vane and motor control. The focusing lens contains a focal length and lens diameter. The focusing lens focuses a collimated light beam from a monochromatic light source to generate a light cone such that the dimensions of the light cone are based on the diameter and focal length of the focusing lens. The light vane deflects light within the light cone. The motor is controlled to position the light vane to attenuate the light within the light cone by placing the light vane in at least one position ranging from a zero stop attenuation position to a full stop attenuation position. For a single degree of light vane rotation into the light cone, the light beams is attenuated by approximately three and a third percent. In the zero stop position, the light vane is parallel to an edge of the light cone so that no light is attenuation. In the full stop position, the light vane is located thirty degrees, relative to the zero stop position, into the light cone. The positioning of the light vane may be calibrated such that the motor control positions the light vane in f-stop increments.

BRIEF DESCRIPTION OF THE DRAWINGS

The objects features and advantages of the present invention will be apparent from the following detailed description of the preferred embodiment of the invention with references to the drawings in which.

NOTATION AND NOMENCLATURE

Some portions of the detailed descriptions which follow are presented in terms of algorithms and symbolic representations of operations. These algorithmic descriptions and representations are the means used by those skilled in the art to most effectively convey the substance of their work to others skilled in the art. An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

The present invention relates, in part, to method steps for a control unit to generate other desired physical signals. The present invention also relates to apparatus for performing these operations. This apparatus may be specially constructed for the required purposes, or it may comprise a general purpose computer selectively activated or reconfigured by a computer program stored in the computer. The algorithms, methods and apparatus presented herein are not inherently related to any particular computer. In particular, various general purpose machines may be used with programs in accordance with the teachings herein, or it may prove more convenient to construct more specialized apparatus to perform the required method steps. The required structure for a variety of these machines will appear from the description given below. Machines which may perform the functions of the present invention include those manufactured by Sony Corporation of America, as well as other manufacturers of control systems.

DETAILED DESCRIPTION OF THE INVENTION

A method and apparatus for a real-time film to video conversion system is disclosed. In the following description, for purposes of explanation, specific nomenclature is set forth to provide a thorough understanding of the present invention. However, it will be apparent to one skilled in the art that these specific details are not required in order to practice the present invention. In other instances, well known circuits and devices are shown in block diagram form in order not to obscure the present invention unnecessarily.

Figure 1:
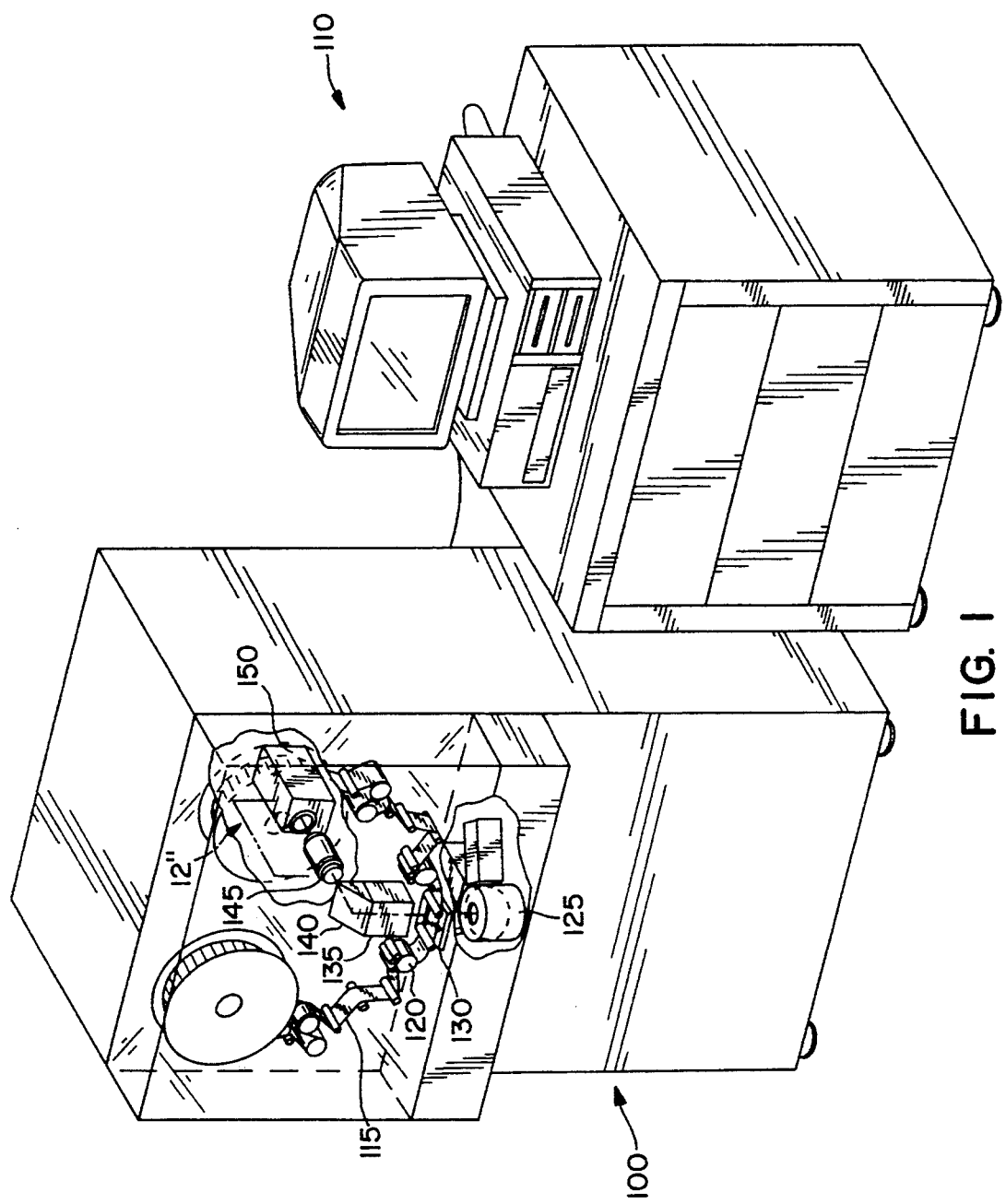
FIG. 1 illustrates a front right perspective view of a telecine configured in accordance with the present invention.

Referring to FIG. 1, a front right perspective view of a telecine configured in accordance with the present invention is illustrated. A telecine 100 is shown coupled to a control unit 110. The control unit 110, operating in conjunction with the telecine 100, provides complete control for all parameters associated with the film to high definition video conversion. The operation of control unit 110 is described more fully below. In a preferred embodiment of the present invention, the telecine 100 converts motion picture film images to SMPTE-240M high definition video. However, the teachings of the present invention could also be applied to other telecine systems. For example, the telecine 100 may be configured to convert motion picture film to either NTSC or PAL standard video formats without deviating from the spirit or scope of the invention. Generally, the telecine 100 converts motion picture film images displayed at 24 frames per second to SMPTE-240M high definition video displayed at 30 frames per second.

The telecine 100 contains a film transport sub-system 120, a camera sub-system 135, a rotating shutter 130 and a lamphouse 125. To convert a motion picture film to a video, the motion picture film, such as film 115 shown in FIG. 1, is coupled to the film transport sub-system 120. The film transport sub-system 120 moves the motion picture film 115 such that the film frames are exposed to the camera sub-system 135. A pulldown period occurs for each motion picture frame wherein the film is moved into a register position. A register period is defined as the period in which the film is held steady in the register position. The lamphouse 125 generates a diffused light source illuminating the film image on film 115 during exposure periods specified by the rotating shutter 130. During the exposure period, the diffused light illuminates the film image to generate an optical film image. The camera sub-system 135 contains a correction lens 145 and a high definition (HD) camera 150. The optical film image is projected onto a mirror 140. The mirror 140 transfers the optical image to the correction lens 145. The correction lens 145 performs optical corrections on the optical film image caused by aberrations in HD camera 150. The HD camera 150 comprises three high definition charged coupled device (CCD) arrays for image detection. In a preferred embodiment of the present invention, the HD camera 150 comprises a Hyper HAD TM CCD array. The optical film image is recorded in the HD camera 150.

Figure 2:
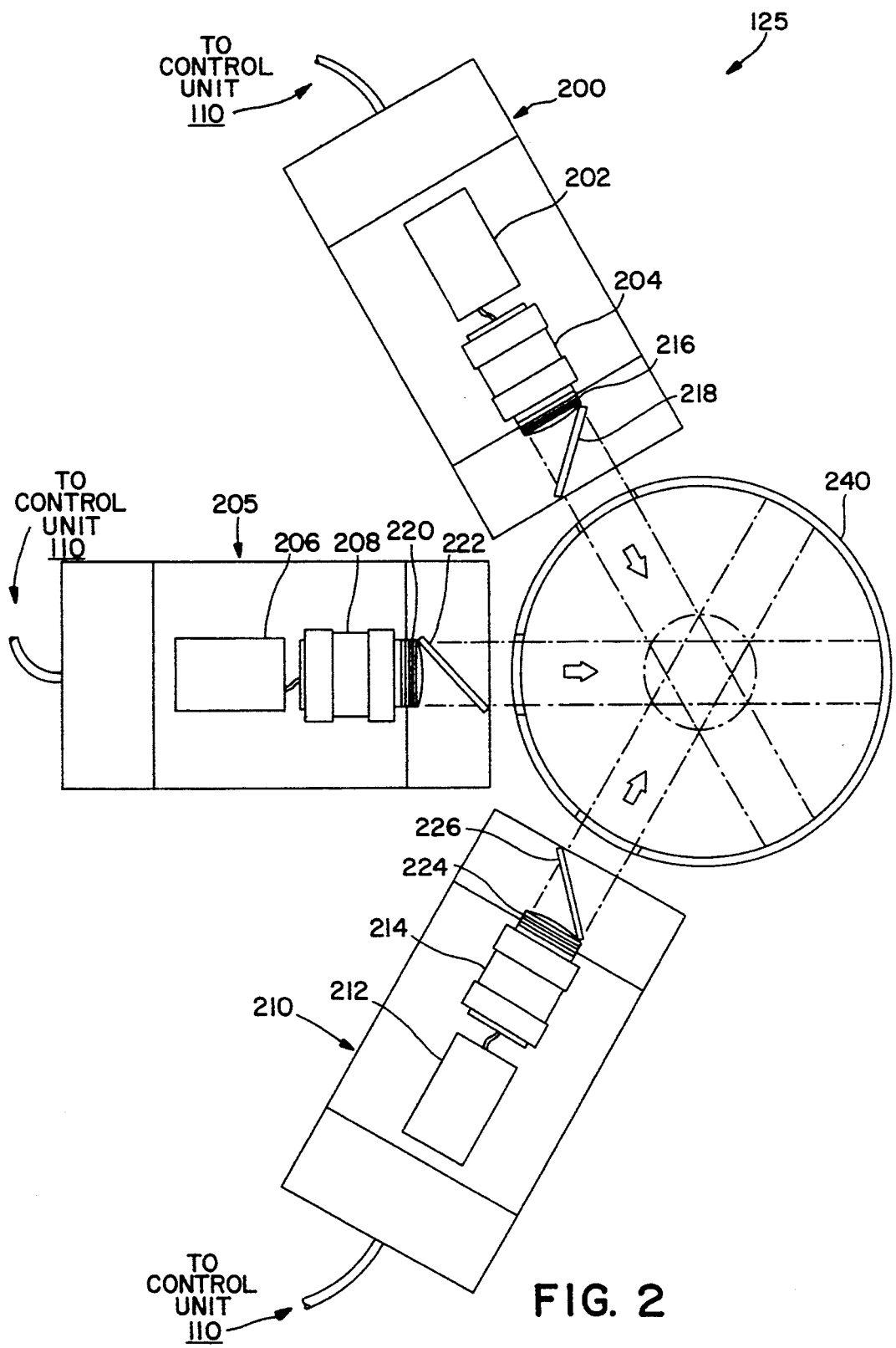
FIG. 2 illustrates a plain view of a lamphouse configured in accordance with the present invention.

Referring to FIG. 2, a plain view of a lamphouse configured in accordance with the present invention is illustrated. The lamphouse 125 contains, in part, three light sources 200, 205 and 210, and an integrating sphere 240. Each of the light sources 200, 205 and 210 generates a collimated light beam. The light sources 200, 205 and 210 contain a non-incandescent lamp such as fluorescent, HMI, CID, CSI or xenon. The CCD arrays in HD camera 150 have different spectral characteristics than tube type pick-up detectors. The spectral sensitivity of present CCD detectors is characterized by poor blue sensitivity and excellent red sensitivity into the infra-red region of the spectrum. The non-incandescent light sources have much higher correlated color temperatures than tungsten light sources, and the non-incandescent light sources provide a better blue output than the tungsten light sources. Consequently, in telecine systems utilizing CCD detectors, light sources comprising non-incandescent lamps provide more efficient light sources than traditional tungsten light sources.

The light sources 200, 205 and 210 contain lamps 204, 208 and 214 respectively. In a preferred embodiment of the present invention, the lamps 204, 208 and 214 are xenon lamps. The xenon lamps output a collimated light beam which consists of a constant color temperature after a specified burn in period regardless of the current supplied to the lamp. The light sources 200, 205 and 210 also contain variable power supplies 202, 206 and 212, respectively. The variable power supplies 202, 206 and 212 are all coupled to a power source (not shown) and to the control unit 110. In addition, light sources 200, 205 and 210 contain light valves 218, 222, and 226, respectively. The light valves 218, 222, and 216 attenuate light output from the corresponding lamp 204, 208 and 214. A detailed description of the operation of the light valves 218, 222 and 226 is provided below.

The collimated light output generated in each of the lamps 204, 208 and 214 is transmitted through a corresponding lens configuration 216, 220 and 224. The lens configurations 216, 220, and 224 filter the light from each corresponding lamp. The output from each of the three lamps is filtered to a specific bandwidth in order to generate three monochromatic light sources. In the preferred embodiment of the present invention, the light sources are separated into green, red, and blue light sources. However, other complimentary color combinations can be used, such as the color trio of cyan, magenta, and yellow, with equal effectiveness. The three monochromatic light sources are input to the integrating sphere 240. The monochromatic light sources are mixed or combined in the integrating sphere 240. The output of the integrating sphere 240 is a highly diffused polychromatic light source. The integrated polychromatic light source is used to generate the film optical image.

Figure 3:
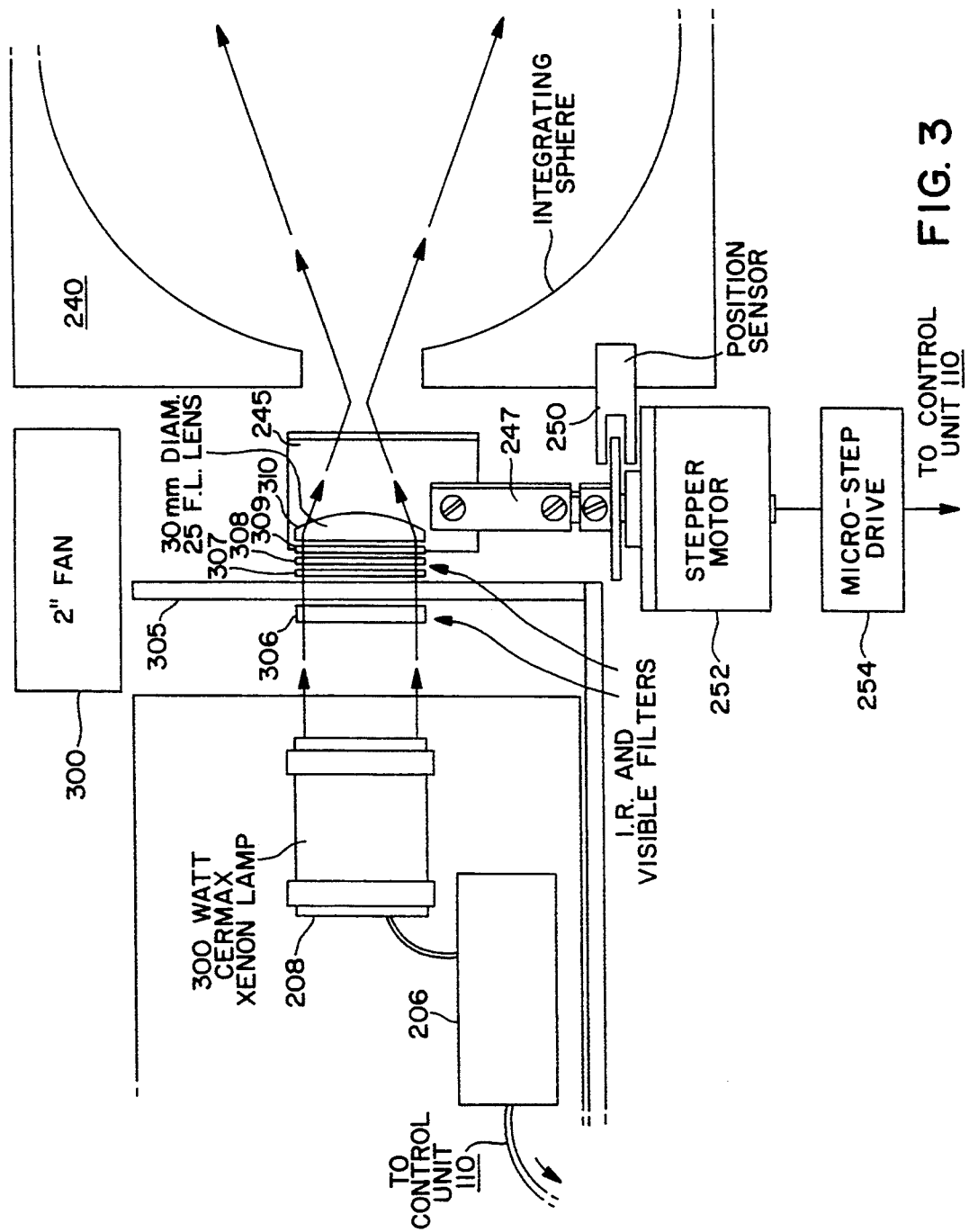
FIG. 3 illustrates a single light source and an integrating sphere configured in accordance with the present invention.

Referring to FIG. 3, a single light source and an integrating sphere configured in accordance with the present invention is illustrated. For purposes of explanation, only a single light source 205 is illustrated in FIG. 3 although the lamphouse 125 of the present invention comprises three such light sources. The light sources 200, 205 and 210 differ only in the spectral characteristics of the corresponding lens configurations. The light source 205 contains a lamp 208 coupled to a variable power supply 206. The variable power supply 206 supplies power to the lamp 208 at a constant voltage but at variable currents. A decreased output in current from the variable power supply 206 results in a linear attenuation of the light output from lamp 208.

In order to control the light intensity output from lamp 208, the variable power supply 206 receives an analog control signal from control unit 110 ranging from 0 to 5 Volts. When control unit 110 supplies a 5 volt control signal to the variable power supply 206, the variable power supply 206 supplies a maximum current output to the lamp 208. However, when less than a 5 volt control signal is provided from control unit 110 to the variable power supply 206, the variable power supply 206 supplies a decreased amount of current to the light source 208. The 0–5 volt control range is linear such that the analog control voltage input to variable power supply 206 is directly proportional to the light intensity output from light source 208. In the present invention, the attenuation of the light output from control of the variable power supply is limited to 50% attenuation.

The collimated light generated from each light source is transmitted through a corresponding lens configuration. As shown in FIG. 3, the light valve configuration 220 comprises a heat mirror 306, three dichroic filters 307, 308 and 309, and a focusing lens 310. The collimated light output from lamp 208 first passes through the heat mirror 306 to reduce the temperature of the light. The light transmitted through each heat mirror is then passed through the three dichroic filters. For the single light source illustrated in FIG. 3, the three dichroic filters are designated 307, 308 and 309. The dichroic filters 307, 308 and 309 filter light from light source 205 to obtain desired spectral characteristics for the light.

Figure 4:
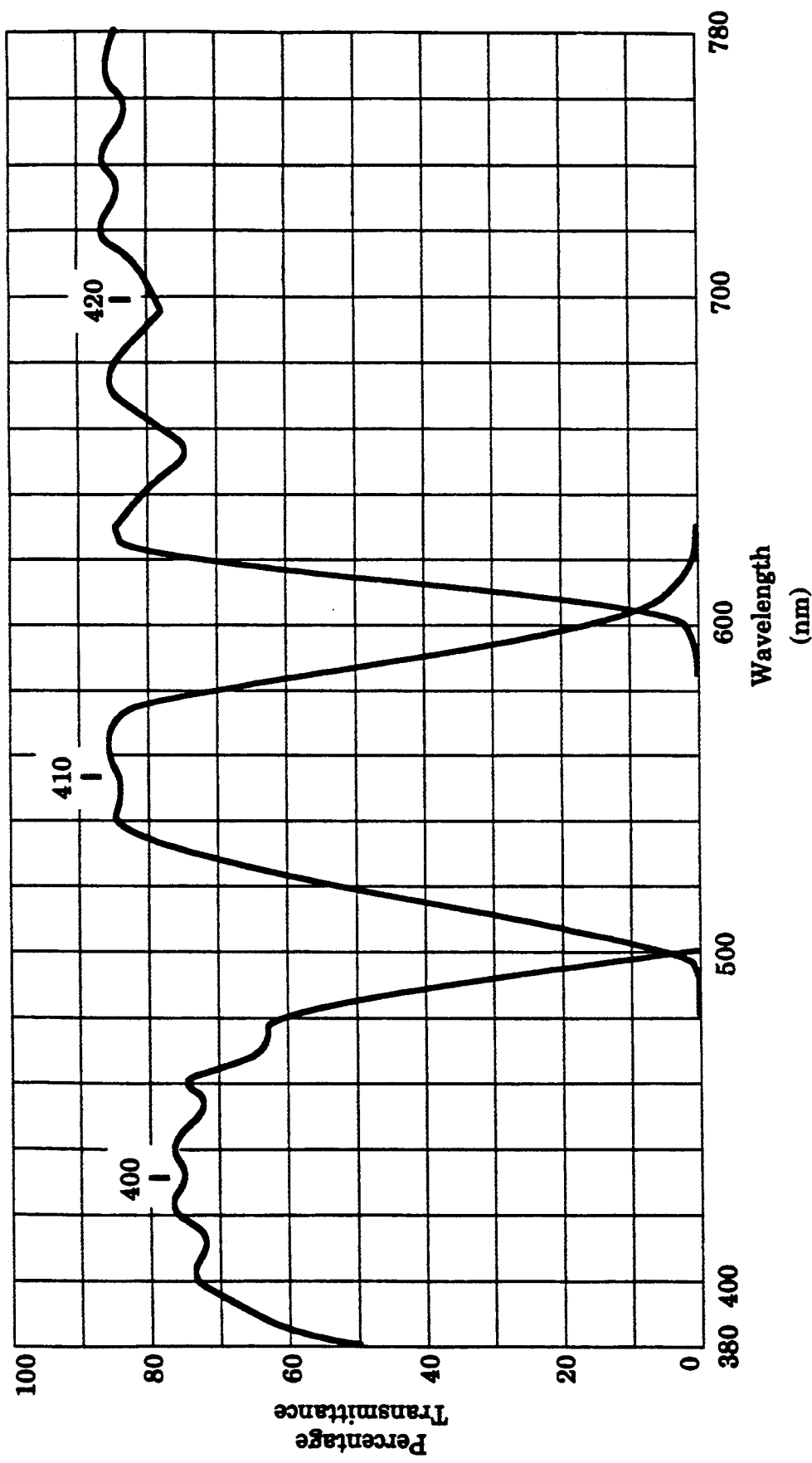
FIG. 4 illustrates the spectral characteristics for dichroic filters configured in accordance with the present invention.

Referring to FIG. 4, spectral characteristics for dichroic filters configured in accordance with the present invention is illustrated. The spectral responses 400, 410 and 420 for the three sets of dichroic filters contained in light sources 200, 205 and 210 are shown. Specifically, FIG. 4 depicts the percentage of light transmittance as a function of the wavelength of the light incident on each set of dichroic filters. The spectral response 400 represents the spectral characteristics required to generate the light source for the blue monochromatic channel, and the spectral response 410 represents the spectral characteristics required to generate the light source for the green monochromatic channel. The spectral response 420 represents the spectral characteristics required to generate the light source for the red monochromatic channel. However, the particular spectral response characteristics for a set of dichroic filters is dependent on the spectral sensitivity for the detector device used in the telecine system. For the preferred embodiment of the present invention, spectral responses 400, 410 and 420 depict the optimal spectral characteristics for the dichroic filters for use with the Hyper HAD TM CCD arrays. The dichroic filters 307, 308 and 309 are intended to represent a broad category of optical filters which are well known in the art and will not be described further.

The three collimated monochromatic light sources output from the three sets of dichroic filters are each input to a focusing lens. The focusing lenses for each of the three lamps in lamphouse 125 are identical. Referring again to FIG. 3, a focusing lens 310 is shown for the single light source 205. Each focusing lens shapes the input light to generate a point source for attenuation by a corresponding light valve and for subsequent input to the integrating sphere 240. In the preferred embodiment of the present invention, the focusing lens for each light source, such as focusing lens 310, comprises an aspheric lens having a 30 mm diameter and a 25 mm focal length. In a preferred embodiment of the present invention, the focusing of the light source from focusing lens 310 results in a one eighth inch beam. However, as one skilled in the art will recognize, the actual optical characteristics for the focusing lens is dependent upon the optical light path, the light valve and the integrating sphere utilized for the particular telecine system.

Still referring to FIG. 3, a light valve 222 for the light source 205 is shown. The light valves 218 and 226 are identical to light valve 222. For the light source 205 shown in FIG. 3, the light valve 222 contains a light vane 245, a stepper motor 252 and a microstep drive 254. The microstep drive 254 is coupled to the stepper motor 252, and the stepper motor is connected to the light vane 245 via a bracket 247. Each light vane comprises a radius and a height. The microstep drive 254, and in turn the stepper motor 252, are controlled by a control pulse from the control unit 110, and the control pulse determines the amount of movement for a shaft on the stepper motor 252. The light vane is constructed of beryllium copper. The placement of the light vane 245 in the optical path of the light source permits a full range of light attenuation. The light valve 222 also comprises a position sensor 250. The position sensor 250 provides feedback for reset and position control of light vane 245.

In operation, a control pulse is provided from control unit 110 to microstep drive 254. The microstep drive 254 then controls the movement of stepper motor 252 to position light vane 245. The stepper motor may be controlled to provide any number of discrete positions for light vane 245. The control unit 110 transmits the control pulse to the microstep drive 254 when the telecine is in the pulldown period. Because the pulldown period is short for the real time telecine system of the present invention, the final positioning of each light vane must occur rapidly. The positioning of each light vane exhibits a fast response time ranging from 5 ms for full light to zero light output attenuation to 5 microseconds (us) for a 6 decibels (dB) light output attenuation. For the real time telecine system of the present invention, the light vane 245 is only moved during the pulldown period. The light vane 245 need only move thirty degrees for full light attenuation, and therefore the time limitation for positioning the light vane during the pulldown period is achievable. Although use of a stepper motor in the present invention results in a maximum response time of approximately 5 ms, a low inertia servo-motor could improve the response time an order of magnitude.

In the telecine system of the present invention, each light output may be attenuated through control of both the variable power supply and the light valve for the corresponding lamp. The control of the variable power supply results in response times for attenuation of the light output three orders of magnitude faster than the response time from the light valve configuration. However, as discussed above, attenuation of light by the variable power supply is limited to 50% attenuation. Therefore, the control unit 110 integrates the control of the variable power supply and the light valve configuration to achieve desired light intensity outputs for color corrections. The majority of color corrections is achieved by control of the variable power supply for the appropriate light source. However, when the required light attenuation for the proper color correction exceeds the 50% limitation, the control unit 110 controls the light valve configuration to attenuate the light output for large increments exceeding the attenuation limitation of the variable power supply. For fine adjustments of light attenuation between the large increments, the control unit 110 controls the variable power supply to attenuate the light output the desired level. The combination of the variable power supply control and the light valve configuration control ensures the best median response time for a required change in color balance.

Figure 5:
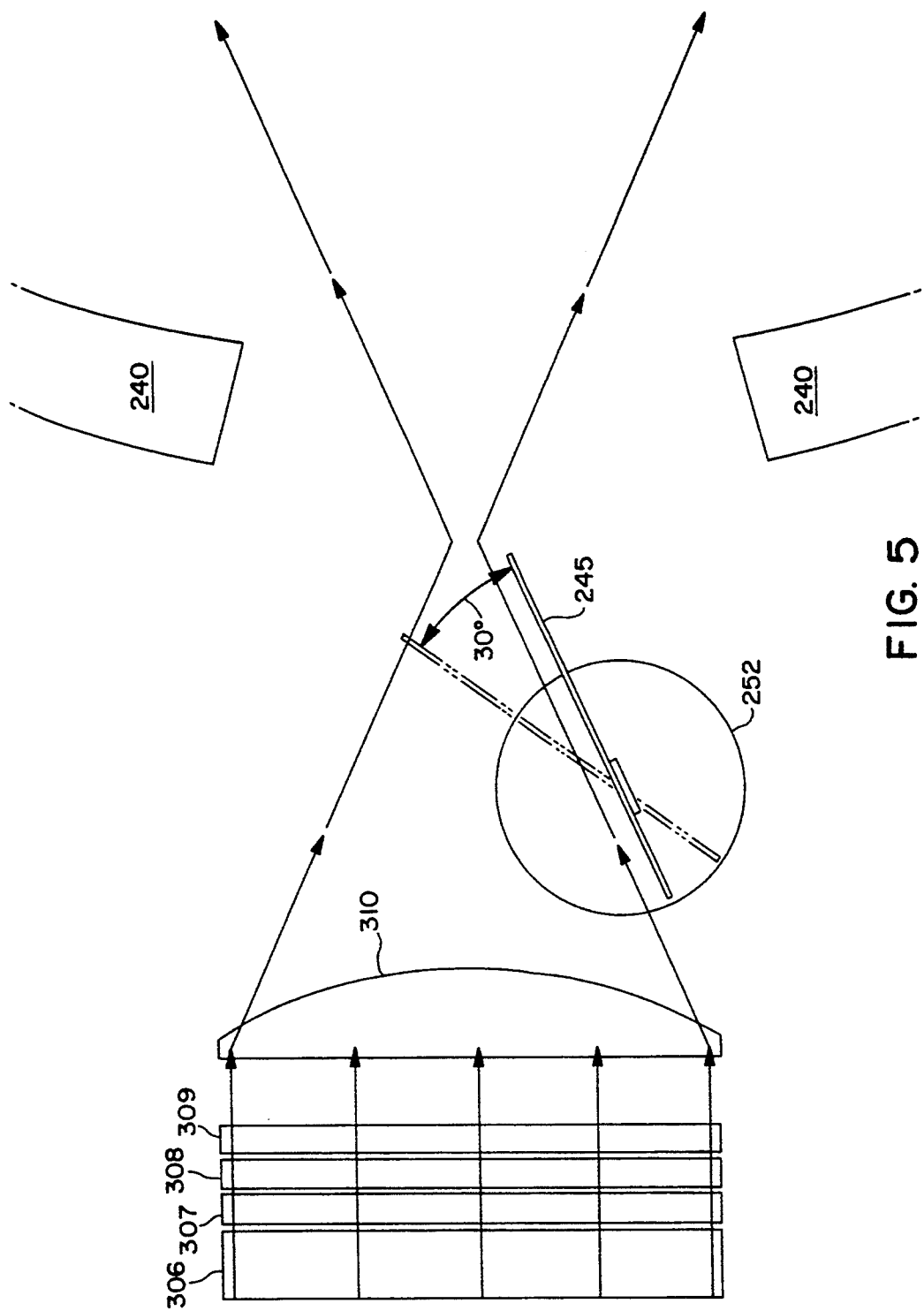
FIG. 5 illustrates a top view of a light valve, a lens configuration, and a spherical integrator configured in accordance with the present invention.

Referring to FIG. 5, a top view of a light valve, a lens configuration, and a spherical integrator configured in accordance with the present invention is illustrated. The light vane 245 illustrated in FIG. 5 is located outside the optical path of the light source. When light vane 245 is located in this position, the light source output from focusing lens 310 is unattenuated. However, movement of light vane 245 thirty degrees from the initial position, as shown by the arrow in FIG. 5, results in complete attenuation of the light beam. In the preferred embodiment of the present invention, the focusing lens 310 generates a focal plane of light comprising a 25 mm. wide collimated beam, and the light vane 245 comprises a 12 mm. radius. The light valve configuration of the present invention exhibits a linear response such that rotation of the light vane 245 into the light beam focal plane results in light modulation which is essentially linear with respect to the angle of rotation. The linear relationship between the position of the light vane and the amount of attenuation provides for simplified control by the control unit 110. Specifically, rotation of the light vane 245 into the focal plane of light results in approximately 3.33% attenuation of light output for every 1 degree of rotation. The height of light vane 245 affects both the response time for positioning the light vane 245 and the resolution of the light output.

Figure 6:
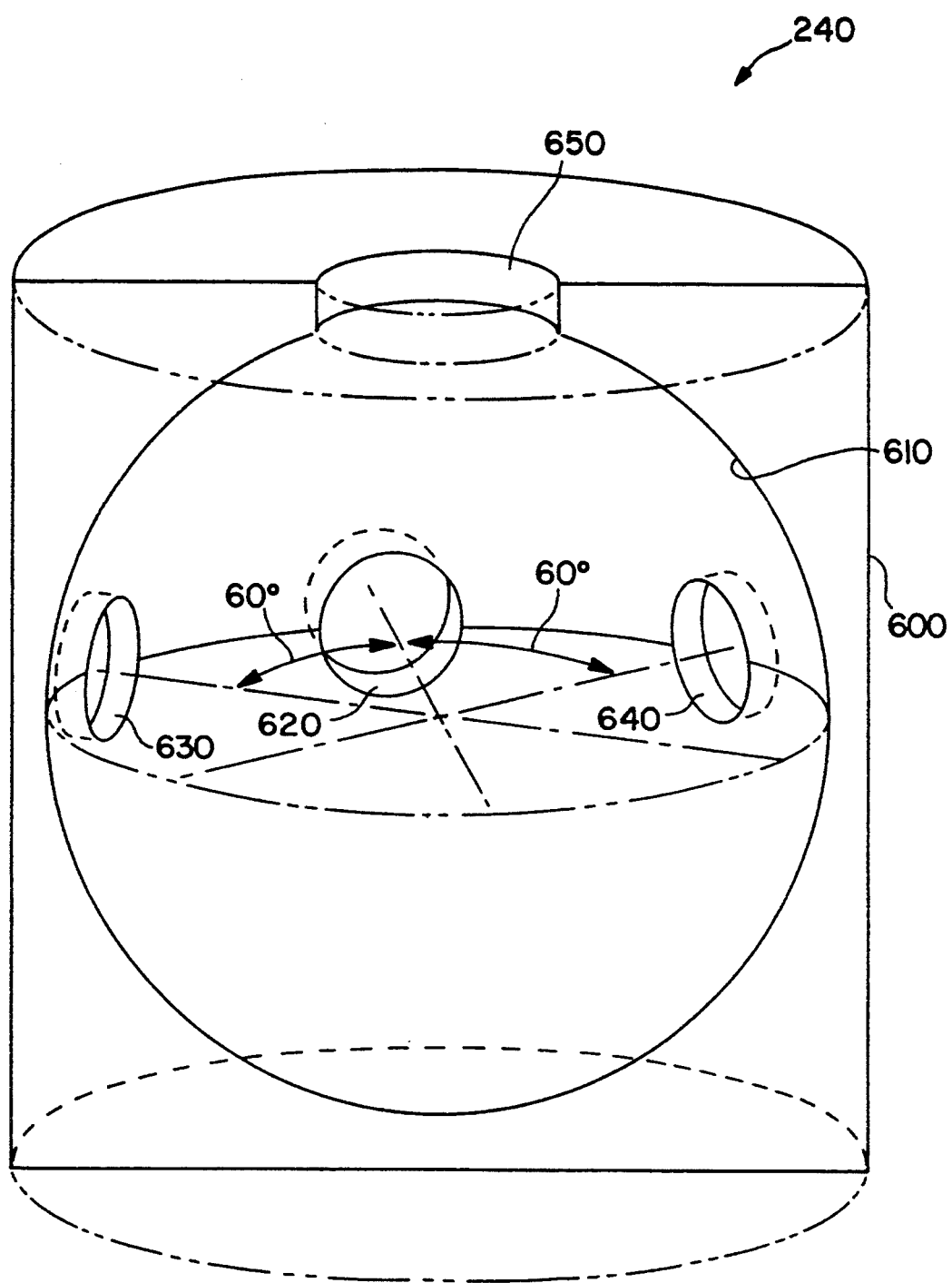
FIG. 6 illustrates a front right perspective view of the spherical integrator configured in accordance with the present invention.

Referring to FIG. 6, a front right perspective view of the integrating sphere 240 configured in accordance with the present invention is illustrated. The integrating sphere 240 comprises three entrance ports 620, 630 and 640. The integrating sphere 240 also comprises an exterior cylindrical shell 600 and an inner sphere 610. Located at the top of integrating sphere 240 is an exit port 650. The light from each monochromatic light source is input into the inner sphere 610 through one of the entrance ports. The entrance ports are located sixty degrees relative to the internal sphere 610. Each monochromatic light source enters a corresponding entrance port and an integrated and diffused light source is generated at exit port 650. In a preferred embodiment of the present invention, the entrance ports comprise a 1 inch diameter, and exit port 650 comprises a 1.5 inch diameter. The port wall comprises an area between inner sphere 610 and outer cylinder 600, and is approximately 0.25 inches thick. The integrating sphere 240 is intended to represent a broad category of optical mixers, such as an integrating sphere used in goniophotometry, which are well known in the art and will not be described further.

The lamphouse of the present invention contributes to overall system performance by providing optimal conditions to realize best signal to noise performance. The independently adjustable dichroically filtered non-incandescent light sources provide the optimal spectral quality for various detector response characteristics. The integrating sphere takes input from the light sources and generates a highly-diffused integrated light source that reduces or eliminates the CCD detector crosstalk and provides an even light field that can reduce shading compensation. In addition, the lamphouse of the present invention provides a separation system that creates color separations based on the primary analysis characteristics of the film emulsion. Therefore, the lamphouse also reduces the magnitude of the film masking matrix coefficients resulting in better signal to noise performance. The lamphouse of the present invention also has application for use in an additive light valve film printer and sequential film scanners. In addition, the lamphouse can be used as a replacement for subtractive light sources used in optical printers.

Figure 7:
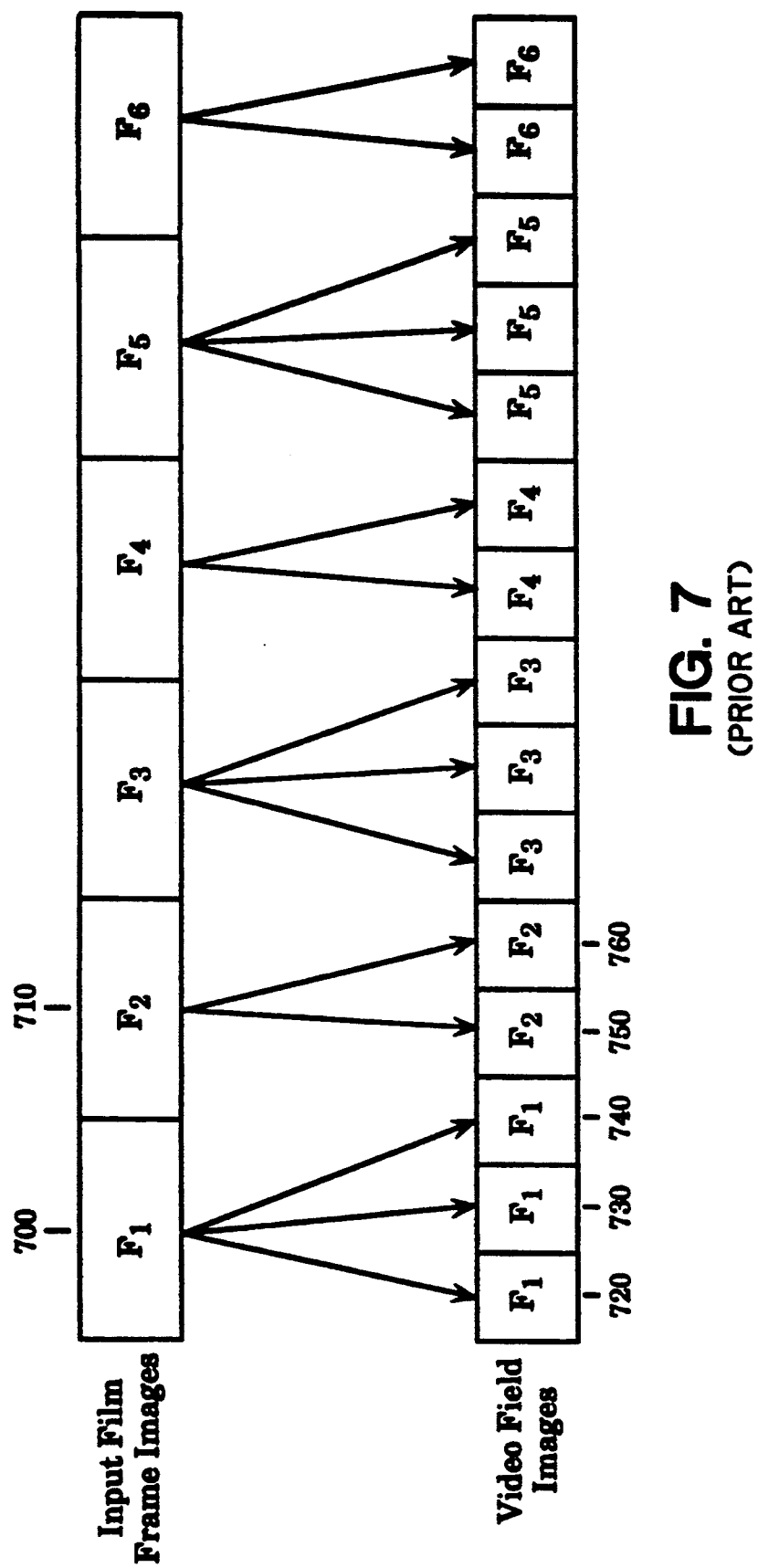
FIG. 7 illustrates the prior art concept of 3-2 pulldown for film to video conversion.

Referring to FIG. 7, the prior art concept of 3-2 pulldown for film to video conversion is illustrated. On a top portion of FIG. 7, input film frame images from a conventional motion picture film are sequentially labeled. Immediately below the film frame images, are video field images for which conversion from the motion picture film to video is desired. For purposes of explanation, the video frame images may comprise either NTSC or SMPTE-240M high definition video. As can be seen from FIG. 7, input film frame image 700 is exposed in three different video periods to generate video field images 720, 730, and 740. This results in video field images 720, 730 and 740 comprising film frame image 700. For film frame image 710, two video field images 750 and 760 are exposed with film frame image 710. The process of exposing three video fields for a first film frame image, and two video fields for a subsequent frame image is repeated.

Figure 8:
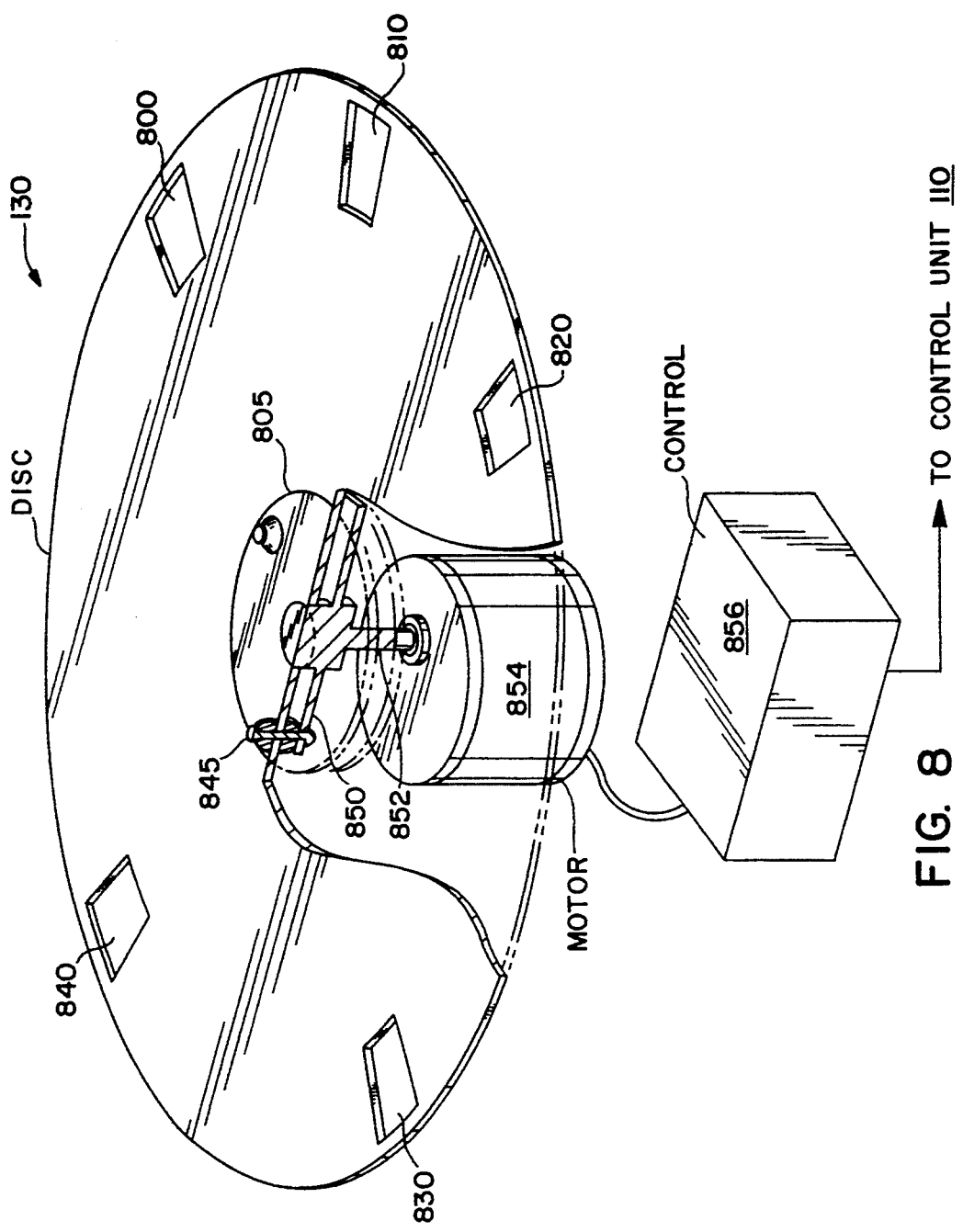
FIG. 8 illustrates a front right perspective view of a rotating shutter configured in accordance with the present invention.

Referring to FIG. 8, a front right perspective view of a rotating shutter configured in accordance with the present invention is illustrated. In a preferred embodiment of the present invention, the rotating shutter 130 provides exposure periods for frame conversion of motion picture film displayed at 24 fps to SMPTE-240M high definition video displayed at 30 fps. The rotating shutter 130 comprises a disc rotated by a motor, wherein the disc comprises five shutter apertures such that five video fields are exposed in one revolution of the disc. To expose the five fields of video per rotation, the rotating shutter 130 comprises shutter apertures 800, 810, 820, 830 and 840. Each shutter aperture permits exposure for one field of video, and the apertures are separated by 49, 49, 72, 78, and 92 degrees respectively.

The rotating shutter 130 is mounted to a central hub 850 via three bushings 845. A shaft 852 couples the rotating shutter 130 to a stepper motor 854. The stepper motor 854 is coupled to a microstep drive 856, which in turn is controlled by the control unit 110. The mounting of rotating shutter 120 to the central hub 850 is non-rigid. The stepper motor 854 provides torque at uneven amounts which is an undesirable characteristic attributable to stepper motors. Due to the uneven torque, the rotating shutter 130 must be mounted loosely in order to spin at accurate rates. The mounting configuration, including the rubber mounted central hub 850, allows the outer perimeter of rotating shutter 130 to be slightly loose. The control unit 110 provides control to microstep drive 856, which causes stepper motor 854 to rotate the rotating shutter 130 at 720 revolutions per minute (rpm). The control of the stepper motor 854 is described more fully below in conjunction with a description of the control unit 110.

Figure 9:
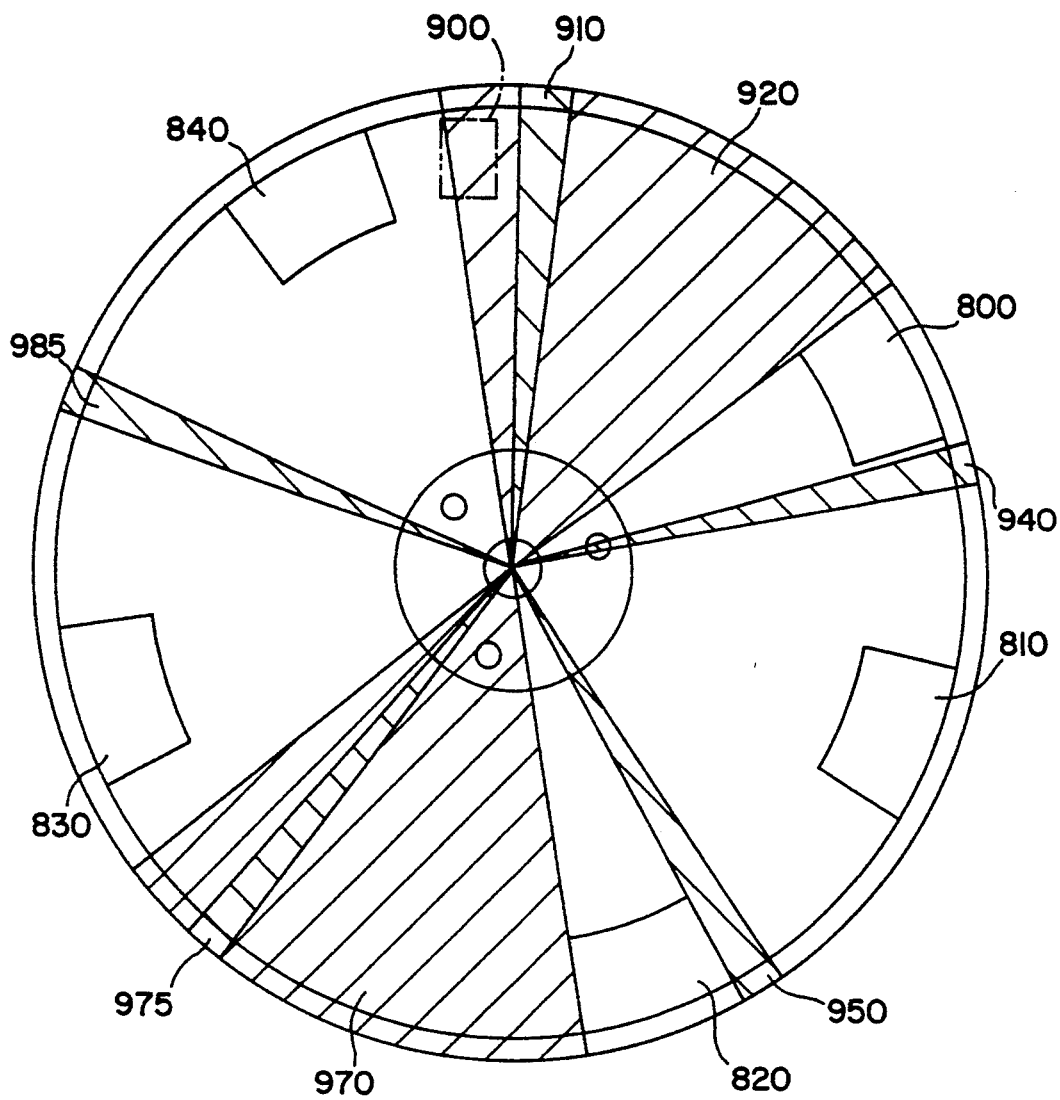
FIG. 9 illustrates a plain view of a rotating shutter incorporating the teachings of the present invention.

Referring to FIG. 9, a rotating shutter incorporating the teachings of the present invention is illustrated. A film aperture 900 comprises an area within the pulldown mechanism in which each frame of the motion picture film sequentially passes. When the telecine system is in the register period, one frame of the motion picture film is located exactly within the dimensions of the film aperture 900. FIG. 9 also illustrates the five shutter apertures 800, 810, 820, 830 and 840. In operation, the rotating shutter 130 rotates at 720 rpm. When one of the shutter apertures passes over the film aperture 900, the integrated diffused light source from the integrating sphere 240 is permitted to pass through the shutter aperture to project the integrated light through the film frame located within the within the dimensions of film aperture 900. A polychromatic optical film image is thus projected from the film frame to the mirror 140.

For purposes of explanation, FIG. 9 illustrates a number of crossed portions within the rotating shutter 130. The crossed triangular portions 910, 940, 950, 975 and 985 graphically represent a period relative to the rotation of the rotating shutter 130 in which HD camera 150 is in a vertical blanking period. The vertical blanking period specifies the time in which accumulated charge is transferred out of the HD CCD arrays, and consequently an exposure of a film frame in the HD camera 150 can not occur during vertical blanking. The larger crossed triangular regions 920 and 970 represent a period relative to the rotation of the rotating shutter 130 in which the telecine system is in the pulldown period. The time required for pulldown is no longer than the time required to rotate the rotating shutter 62 degrees. As discussed above, the pulldown period is the time at which the film transport sub-system moves the film for placement of the next frame within the film aperture 900. The exposure of an optical film image onto the HD camera 150 cannot occur during the pulldown because the film frame is not stable. Therefore, in order to properly transfer the film to video in a 3-2 pulldown transfer arrangement, the exposure of the optical film image must occur outside both the pulldown period and the vertical blanking period. As shown in FIG. 9, the rotating shutter 130 exposes the film frame in a period outside both the HD camera vertical blanking period and the telecine system pulldown period.

The present invention employs a pin registration system that registers on the perforations of the film in the same manner that the original motion picture camera registered on the film. The pin registration system is described more fully below in conjunction with a description of the pulldown mechanism. Because the telecine system of the present invention converts film to high definition video, such an accurate film transport system is required. The pin registration system requires that the pulldown of the film occur in constant intervals. As shown by the crossed triangular portions 920 and 970 in FIG. 9, the pulldown period for the telecine system of the present invention occurs at constant intervals. The constant or even pulldown periods permit the use of a pin registration system to provide the accurate positioning of the film frames. Therefore, the 3-2 pulldown required for film to high definition video conversion is generated by varying when the exposures to the camera occur.

As shown in FIG. 9, after the pulldown period 920, the shutter apertures 800, 810 and 820 expose a single film frame to generate three video field images. After the pulldown period 970, the shutter apertures 830 and 840 expose the next film frame to generate two video field images from the single film frame. Therefore, the present invention, comprising pulldown periods in constant intervals, generates the 3-2 conversion by controlling when the exposures of the film frames to the HD camera occur. As an alternative to the rotating shutter 130 of the present invention, generation of the 3-2 conversion by varying when the exposures occur may be accomplished through control of the electronic shutter in the HD camera 150.

In a preferred embodiment of the present invention, each portion of the optical frame image is exposed to the HD camera 150 for 2 ms. Although each portion of the optical film image will only be exposed to the HD camera for 2 ms, a 4 ms period is required to expose the entire optical film image for each film frame. For example, shutter aperture 800 located at 52 degrees on the rotating shutter 130 begins exposure of a first portion of an optical image as shutter aperture 800 passes under the film aperture 900. In 2 ms after the beginning of the exposure, the shutter aperture 800 is located exactly over film aperture 900. In the next 2 ms, the shutter aperture 800 continues to pass over the film aperture 900, resulting in exposure of a latter portion of the optical film image. The pulldown periods 920 and 970 illustrated in FIG. 9 provide a worst case scenario for the time required for actual pulldown. In practice, the pulldown period may occur in only 90 degrees of rotation of the rotating shutter. However, the 124 degrees of rotation for the pulldown period takes into account any vibrational shock caused from the stop and start of the film by the film transport sub-system. In addition, the 124 degree pull down period also considers the time for pin registration in the film transport sub-system.

Figure 10:
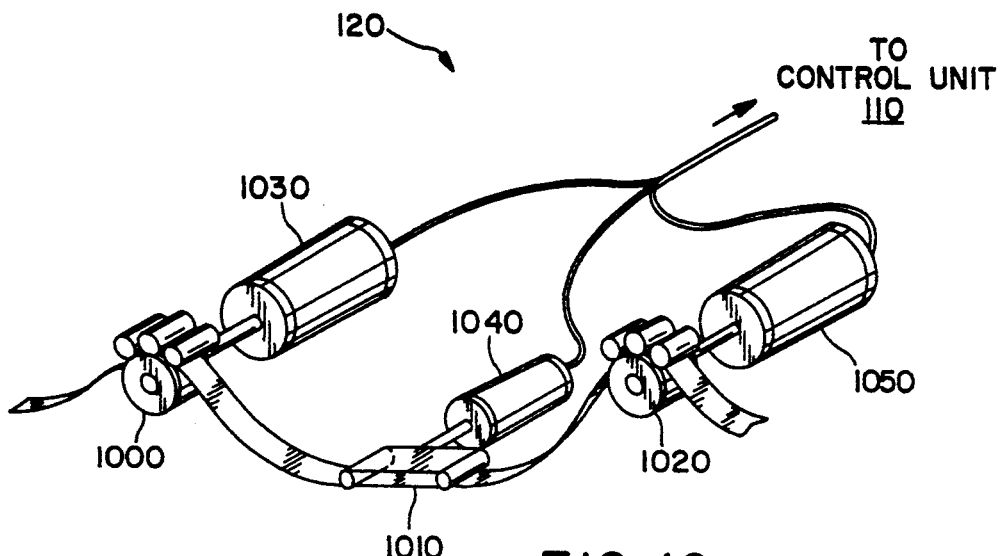
FIG. 10 illustrates a portion of a film transport system configured in accordance with the present invention.

Referring to FIG. 10, a portion of a film transport system configured in accordance with the present invention is illustrated. The film transport sub-system 120 comprises a supply sprocket 1000, a pulldown mechanism 1010, and a take-up sprocket 1020. The supply sprocket 1000 and take-up sprocket 1020 are coupled to stepper motors 1030 and 1050, respectively. The pulldown mechanism 1010 contains a center sprocket and is coupled to a servo motor 1040. The stepper motors 1030 and 1050, and the servo motor 1040 are coupled to control unit 110. The control unit 110 provides film transport control signals or pulses trains to drive the rotation of stepper motors 1030 and 1050 such that the film is transferred at 24 fps. The control of servo motor 1040 and stepper motors 1030 and 1050 is described more fully below.

The pulldown mechanism 1010 controls the accurate movement of the motion picture film during the pulldown period and holds the film steady during the register period. In order to insure accurate pulldown such that the outer perimeters of one film frame exactly reside in the film aperture 900, the pulldown mechanism 1010 employs a pin registration system. The pin registration system, driven by the servo motor 1040, registers on the perforations in the same manner that the motion picture camera registered on the film to create the original image. The pulldown mechanism 1010 also contains an encoder coupled to the shaft of the servo motor 1040. The encoder counts the number of revolutions of the shaft on the servo motor 1040. The shaft revolution count is transmitted to the control unit 110. The control unit 110 utilizes the count to control the supply and take-up sprockets 1000 and 1020 as is explained more fully below. The encoder contained in pulldown mechanism 1010 is intended to represent a broad category of encoding devices, such as an optical encoding device, which are well known in the art and will not be described further.

Figure 11:
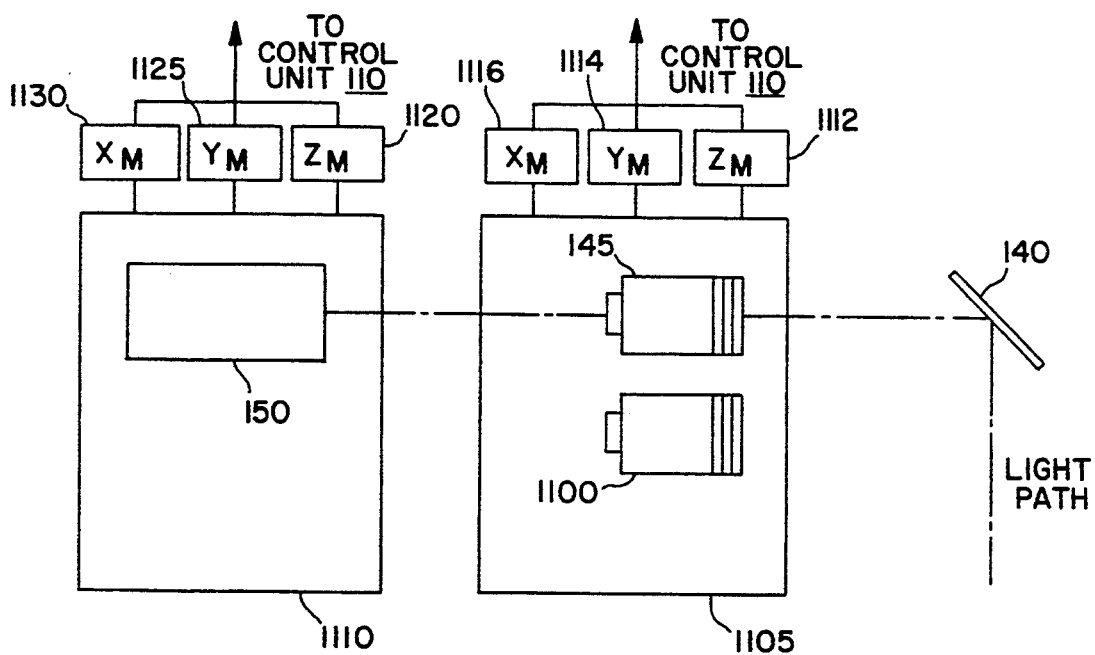
FIG. 11 illustrates a corrective lens and camera system configured in accordance with the present invention.

Referring to FIG. 11, a corrective lens and camera system configured in accordance with the present invention is illustrated. The optical film image is reflected from the mirror 140 and input to the correction lens 145 as shown by the light path in FIG. 11. The correction lens 145 performs optical corrections on the optical film image, and the corrected optical film image is then input to the HD camera 150. The HD camera 150 comprises prism optics which separate the polychromatic optical film image into its constituent monochromatic film images. Each monochromatic film image is then projected onto a high density CCD array. The optical corrections performed in the correction lens 145 correct for spherical and axial color aberrations caused by the prism optics in HD camera 150. The lens configuration to obtain the desired optical correction is dependent upon the prism for the particular camera used in a telecine system. The correction lens 145 is intended to represent a broad category of optical correction devices which are well known in the art and will not be described further.

The correction lens 145 is mounted on a lens adjustable mount 1105, and the HD camera 150 is mounted on a camera adjustable mount 1110. An additional correction lens 1100 is also mounted on the lens adjustable mount 1105. The lens adjustable mount 1105 is coupled to three stepper motors $X_m$ 1116, $Y_m$ 1114 and $Z_m$ 1112, and the camera adjustable mount 1110 is coupled to three motors $X_m$ 1130, $Y_m$ 1125, and $Z_m$ 1120. All six motors are controlled remotely from the control unit 110. Each set of the three motors controlling the positioning of lens adjustable mount 1105 and the camera adjustable mount 1110 adjust the respective mount in one physical dimension. The motor controlled adjustable mounts 1105 and 1110 permit precise optical alignment from the control unit 110.

The $X_m$ motors 1116 and 1130 and the $Y_m$ motors 1114 and 1125 provide the ability to position the optical film image onto the optical center of the HD CCD arrays. In addition, the $X_m$ motor 1116 and the $Y_m$ motor 1114 move the lens adjustable mount to pan and scan the optical film image in the X and Y dimension. The pan and scan operation adjusts the X and Y positioning of the optical film image on a scene by scene basis to compensate for the proportional differences between motion picture film frame dimensions and video frame dimensions. The $Z_m$ motors 1112 and 1120 move the lens adjustable mount 1105 and the camera adjustable mount 1110 respectively in a Z dimension to adjust the magnification of the optical film image projected on the HD camera 150. After the proper magnification is achieved, the $Z_m$ motor 1120 moves the Z dimension of the camera adjustable mount to focus the optical film image in the HD camera 150.

In a preferred embodiment of the present invention, during an initial set-up period, the corrective lens 145 and the HD camera 150 are positioned to focus the film optical image on the optical center of the HD camera 150. After the initial positioning, only the lens adjustable mount is adjusted for the pan and scan operation because the correction lens 145 is lighter and easier to control than the HD camera 150. In reality, movement of the correction lens 145 for the pan and scan operation does not change the optical centers enough to warrant readjustment. The $X_m$ and $Y_m$ motors 1130 and 1125 are provided for completeness allowing three dimensional position control of the HD camera 150.

Figure 12:
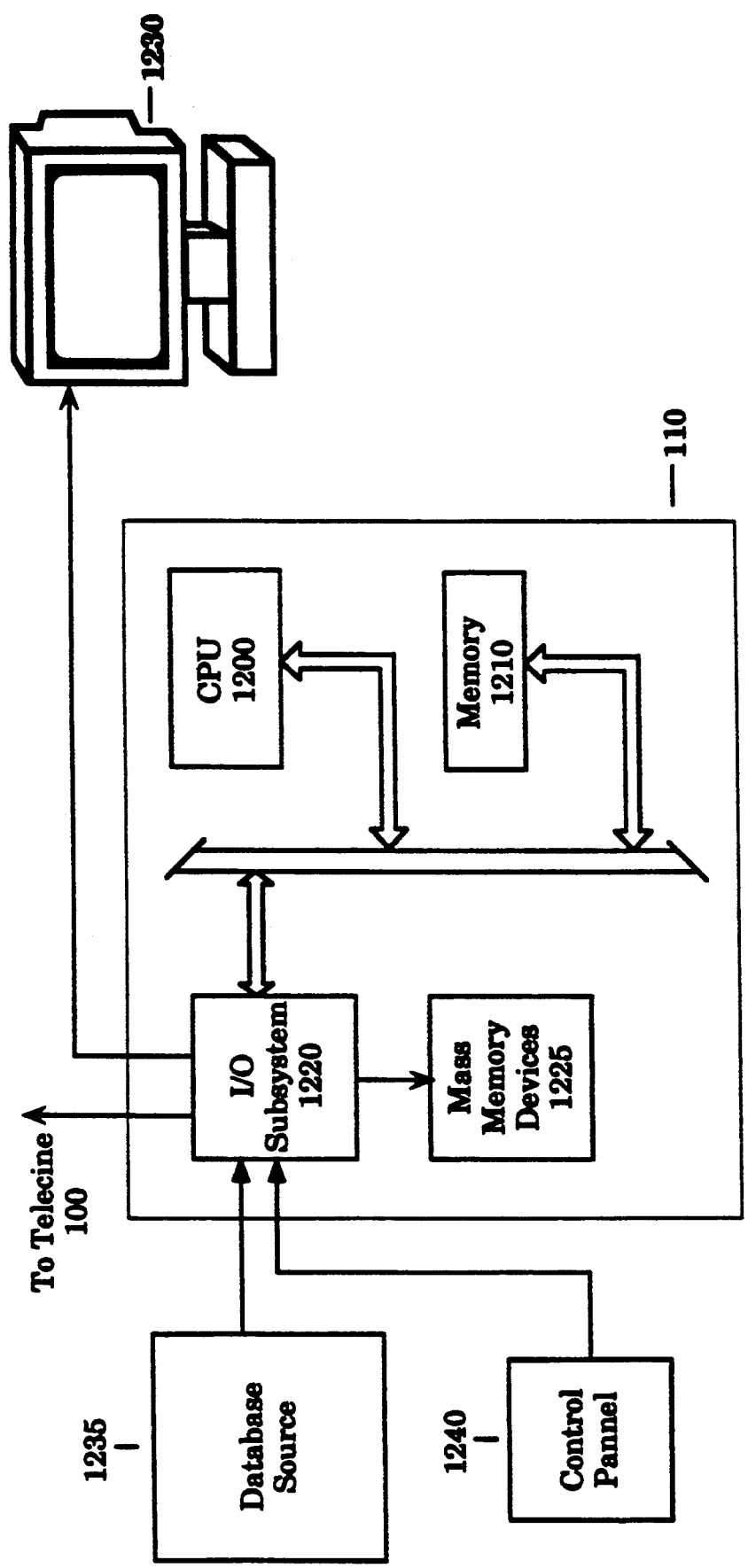
FIG. 12 illustrates a functional block diagram of a control unit configured in accordance with the present invention.

Referring to FIG. 12, a functional block diagram of a control unit configured in accordance with the present invention is illustrated. In a preferred embodiment of the present invention, the control unit 110 comprises an IBM TM compatible personal computer system. Although a computer system is disclosed, the control unit 110 may comprise any device capable of performing the functions described below. FIG. 12 conceptually illustrates the major components for a typical computer system which may comprise the control unit 110. The control unit 110 comprises a central processing unit (CPU) 1200, and a memory 1210. The CPU 1200 and memory 1210 are coupled to an I/O subsystem 1220. The I/O subsystem 1220 is coupled to a mass memory device 1225 and a plurality of external devices. It will be appreciated that additional devices may be coupled to the control unit 110 for storing data, such as magnetic tape drives, buffer memory devices and the like. The mass memory device 1225 may store data and programs for the control and operation of the control unit 110. The control unit 110 also comprises a display monitor 1230. A cursor control device is provided through a touch screen on the display monitor 1230. These major components of control unit 110 are those typically found in most computers and, in fact, the control unit 110 is intended to be representative of a broad category of data processing devices.

Figure 13:
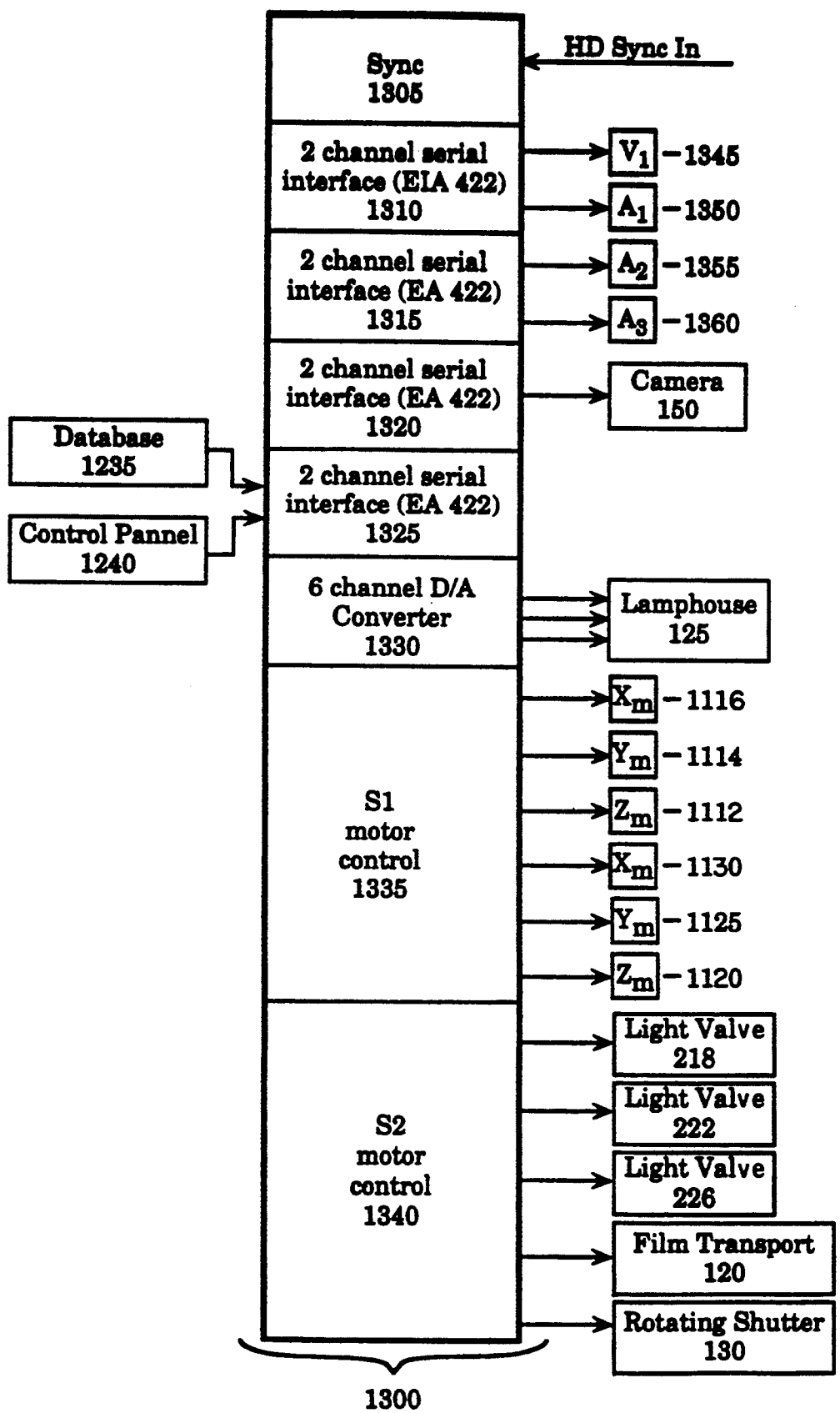
FIG. 13 illustrates a control unit interface configured in accordance with the present invention.

Referring to FIG. 13, a control unit interface configured in accordance with the present invention is illustrated. In general, the control unit interface 1300 is part of the I/O subsystem 1220 and contains a plurality of peripheral interface devices for controlling the telecine 100. In addition, the control unit interface 1300 receives input from a database 1235 and a control panel 1240. Specifically, the control unit interface 1300 comprises a synchronization card 1305, four dual channel serial interface cards 1310, 1315, 1320 and 1325, a six channel digital to analog (D/A) converter 1330, and two motor control cards 1335 and 1340. All of the interface devices on the control unit interface 1300 may be accessed and controlled by the CPU 1200.

In general, the synchronization card 1305 generates clocking and timing signals for operation in conjunction with the control unit 110. The synchronization card 1305 receives a high definition video sync input (HD Sync In) signal. The HD Sync In may be generated from the video sync signal in the HD camera 150. In a preferred embodiment of the present invention, the HD Sync In signal is generated by a precision high definition video sync source to provide accurate synchronization of all high definition video components. In general, the synchronization card 1305 generates a plurality of derivative frequencies based on the HD Sync In. In this way, the synchronization card 1305 provides timing sources which are locked to the precision high definition video sync signal. The generation of derivative frequencies, which are phase locked to a primary frequency, from a primary frequency, such as the HD Sync In, is well known in the art and will be not be described further.

The serial interface cards 1310 and 1315 are coupled to a plurality of multi-media resources. Specifically, a first channel of the serial interface card 1310 is connected to a high definition video tape recorder 1345. A second port of the serial interface card 1310 is coupled to an audio source 1350. The serial interface card 1315 has both a first and second port coupled to audio sources 1355 and 1360. The serial interface card 1320 is coupled to the high definition camera 150. The serial interface card 1320 receives a high definition video sync signal from the synchronization card 1305 or from a precision time source. The precise high definition video sync signal is synchronized to the video sync signal in the HD camera 150. In this way, complete synchronization is achieved between the high definition video sync source, the control unit 110 and the HD camera 150. The serial interface card 1325 is capable of receiving data from the database 1235 and the control panel 1240. The control panel 1240 provides the ability for a user to control the multi-media resources coupled to the control unit 110. The utilization of the database 1235 is described more fully below.

Three channels of the six channel D/A converter 1330 are coupled to the lamphouse 125. The three channels of the D/A converter 1330 output the analog control voltage that determines the amount of current output from each power supply in the three monochromatic light sources. To accomplish this task, the CPU 1200 drives the D/A converter 1330 to output three analog signals ranging from 0 to 5 volts. The three channels of the D/A converter 1330 are independently controlled. Therefore, the control unit 110 may set the power level of each monochromatic channel separately and independently. The control of each variable power supply is linear such that the input analog voltage applied corresponds to the output current supplied to the corresponding lamp. The light intensity output may be attenuated approximately one stop. The generation of the analog control voltage for control of the lamphouse power supplies is discussed more fully below in conjunction with calibration of the control unit 110.

The control unit interface 1300 also contains S1 and S2 motor control cards 1335 and 1340. The S1 motor control card 1335 controls $X_m$ 1116, $Y_m$ 1114, and $Z_m$ 1112 for movement of the lens adjustable mount 1105. The S1 motor control card 1335 generates a pulse frequency to control the positioning of the lens adjustable mount 1105. The S1 motor control 1335 also controls $X_m$ 1130, $Y_m$ 1125, and $Z_m$ 1120 for movement of the camera adjustable mount 1110. The S2 motor control card 1340 controls six stepper motors and one servo motor. Specifically, the S2 motor control card 1340 controls the stepper motors in each light valve 218, 222 and 226. The S2 motor control card 1340 generates a pulse frequency proportional to the amount of movement desired for the corresponding light vane. The S2 motor control card 1340 transmits the pulse frequency to the light valves 218, 222 and 226 only during the pulldown period of the telecine. In addition, the light valve configurations 218, 222 and 226 are controlled independently such that each light vane within a corresponding light valve configuration may be set to a different position.

The S2 motor control card 1340 controls the movement of supply sprocket 1000, take up sprocket 1020 and pulldown mechanism 1010. A film transport frequency derived from the synchronization card 1305 is supplied to the S2 motor control card 1340. Consequently, the film transport frequency is locked to a derivative of the video sync frequency. The locking of the video sync frequency to the film transport frequency permits control of the film transport sub-system relative to telecine system operation. As discussed above, an encoder is coupled to the shaft of the servo motor 1040 for generating a count. The count is fed back to control unit 110, and is used to stop and start the center sprocket in the pulldown mechanism 1010. In addition, the count is also used to control the supply and take-up sprockets 1000 and 1020. The servo motor 1040 permits a fine degree of control in the stopping point of each succeeding tooth on the center sprocket. In addition, the control and operation of pulldown mechanism 1010 permits the film transport sub-system 120 to operate at a wide range of speeds. The intermittent film transport system 120 and the S2 motor control card provide optimal performance for accurate placement of film frames.

The S2 motor control card 1340 also controls the rotation of rotating shutter 130. A rotating shutter frequency, derived from the synchronization card 1305, is supplied to the S2 motor control card 1340. The rotating shutter frequency is used to generate shutter control pulses to drive the stepper motor 854 for rotation of the rotating shutter 130 at 720 rpm. By using a derivative frequency to control the stepper motor 854, the rotation of the rotating shutter 130 is phased-locked to the HD Sync In signal. The synchronization of the rotating shutter frequency and the HD Sync In insures that shutter apertures 800, 810, 820, 830 and 840 expose the optical film images to the HD camera 150 at the appropriate times. The integrity of the timing for exposure periods generated by the rotating shutter 130 is also insured by tracking the rotating shutter via an open loop control system. The open loop control system of the S2 motor control card 1340 counts the shutter control pulses transferred to micro step drive 856. The rotating shutter count is normalized to the HD Sync In signal to detect any drift from the shutter control pulse with the HD Sync In signal. If the count comparison indicates that the shutter control pulse is driving the rotating shutter 130 is too fast or slow, then the pulse frequency for subsequent shutter control pulses transmitted to the rotating shutter 130 is compensated accordingly.

The telecine system of the present invention is initially calibrated such that the lamphouse 125 illuminates the film image at desired levels of light intensity. The initial calibration session correlates values generated from the control unit 110 to a specific light intensity output from the lamphouse 125. In a preferred embodiment of the present invention, the light intensity values are calibrated to an absolute scale so as to match "F-stop" values provided on a motion picture film camera. The control unit 110 interface permits the user to enter a value on a scale ranging from 0–50 for each monochromatic channel. When converting a motion picture film to HD video, a cinematographer sets the light intensity for a scene corresponding to a desired light level through the system interface of the control unit 110. The value for the light intensity settings is stored in database 1235. Subsequently, the value may be retrieved for film to video conversion. In addition to light intensity settings, the positioning for the correction lens 145 and the HD camera 150, as well as other camera setup parameters are stored in database 1235.

The telecine system of the present invention operations in conjunction with a color corrector system. In general, the color corrector system performs various transforms to correct for film and video signal characteristics. In correcting for the film characteristics, the color corrector system performs film masking matrix processing which compensates in each monochromatic channel for crosstalk among polychromatic color emulsions of the original film stock. In addition, the color corrector system performs characteristic curve processing for each channel in accordance with a Hurter-Driffield characteristic curve. The Hurter-Driffield characteristic curve depicts the relationship between the film dye density and a logarithm of the relative film exposure such that the color corrector system considers gamma, minimum and maximum film dye densities and shadow and highlight compression. The video signal characteristics include electronic channel cross talk and non-linear responses. For a detailed description of a color correction system for use in conjunction with the telecine system of the present invention see U.S. patent application Ser. No. 07/710,704, filed on Jun. 5, 1991, entitled *Digital Color Correction System and Method*, assigned to the assignee of the present invention, Sony Corporation of America, Park Ridge, N.J., now U.S. Pat. No. 5,255,083.

In a preferred embodiment of the present invention, the color correction parameters associated with the film are stored in the database 1235. The color correction parameters for the film are used as an initial starting point for the calibration of the telecine system. The telecine system of the present invention provides complete control over all aspects of the film to high definition video conversion, and therefore the telecine system generates a HD video output that maintains the integrity associated with the initial color correction parameters. Subsequently, in the color correction phase, the initial color correction values can be used as absolute values for performing the color correction functions. Therefore, traditional altering of the adjustments for color correction based on subjective criteria is replaced with a more objective analytical approach so that the integrity of the color correction values is maintained throughout the film to video conversion.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An apparatus for attenuating a light beam comprising:

focusing means for generating a cone shaped light beam from said light beam, said focusing means comprising a diameter and a focal length wherein outer perimeters of said cone shaped light beam are configured in accordance with said diameter and said focal length;

light vane means for deflecting at least a portion of said cone shaped light beam, said light vane means comprising a face having a height and a width, said height being at least equal to said diameter of said focusing means; and positioning means coupled to said light vane means for positioning said light vane means within the cone shaped light beam to attenuate said cone shaped light beam, said positioning means placing said light vane means in at least one position ranging from a zero stop position to a full stop position, said face of said light vane means being parallel to an edge of said cone shaped light beam and said width of said face extending to a focal point of said cone shaped light beam for said zero stop position and said face of said light vane being 30 degrees into said cone shaped light beam relative to said face in said zero stop position for said full stop position.

2. The apparatus for attenuating the light beam as claimed in claim 1 wherein said light vane means is constructed of beryllium copper.

3. The apparatus for attenuating said light beam as claimed in claim 1 wherein placement of said light vane means by said positioning means results in approximately three and a third percent light attenuation for a single degree of light vane rotation into said cone shaped light beam.

4. The apparatus for attenuating the light beam as claimed in claim 1 wherein said positioning means comprises control means for controlling said positioning means, said control means specifying a position ranging from said zero stop position to said full stop position for said light vane means and said positioning means placing said light vane means in said position.

5. The apparatus for attenuating the light beam as claimed in claim 4 wherein said control means further comprises stop setting means for positioning said light vane means so as to attenuate said cone shaped light beam in f-stop increments.

6. An apparatus for attenuating a light beam comprising:

a focusing lens for generating a cone shaped light beam from said light beam, said focusing lens comprising a diameter and a focal length wherein outer perimeters of said cone shaped light beam and focal point of said cone shaped light beam are configured in accordance with said diameter and said focal length of said lens;

a light vane for deflecting at least a portion of said cone shaped light beam, said light vane comprising a face having a height and a width, said height being at least equal to said diameter of said focusing lens; and a motor coupled to said light vane for positioning said light vane within the cone shaped light beam to attenuate said cone shaped light beam, said motor placing said light vane in at least one position ranging from a zero stop position to a full stop position, said face of said light vane being parallel to an edge of said cone shaped light beam and said width of said face extending to said focal point of said cone shaped light beam for said zero stop position, and said face of said light vane being 30 degrees into said cone shaped light beam relative to said face in said zero stop position for said full stop position.

7. The apparatus for attenuating the light beam as claimed in claim 6 wherein said light vane is constructed of beryllium copper.

8. The apparatus for attenuating said light beam as claimed in claim 6 wherein placement of said light vane by said motor results in approximately three and a third percent light attenuation for a single degree of light vane rotation into said cone shaped light beam.

9. The apparatus for attenuating the light beam as claimed in claim 6 wherein said apparatus further comprises a control unit coupled to said motor for controlling placement of said light vane, said control unit generating a pulse frequency specifying a position ranging from said zero stop position to said full stop position for said light vane such that said motor places said light vane in said position.

10. The apparatus for attenuating the light beam as claimed in claim 9 wherein said control unit further comprises stop setting values for generating said pulse frequency for positioning said light vane so as to attenuate said cone shaped light beam in f-stop increments.

11. A method for attenuating a light beam comprising the steps of:

focusing said light beam in accordance with a diameter and a focal length to generate a cone shaped light beam from said light beam;

providing a light vane for deflecting at least a portion of said cone shaped light beam, said light vane comprising a face having a height and a width, said height being at least equal to said diameter; and positioning said light vane within the cone light beam to attenuate said cone shaped light beam by placing said light vane in at least one position ranging from a zero stop position to a full stop position, said face of said light vane being parallel to an edge of said cone shaped light beam and said width of said face extending to a focal point of said cone shaped light beam for said zero stop position and said face of said light vane being 30 degrees into said cone shaped light beam relative to said face in said zero stop position for said full stop position.

12. The method for attenuating the light beam as claimed in claim 11 wherein said step of providing a light vane comprises the step of providing a light vane constructed of beryllium copper.

13. The method for attenuating said light beam as claimed in claim 11 wherein the step of positioning said light vane results in approximately three and a third percent light attenuation for a single degree of light vane rotation into said cone shaped light beam.

14. The method for attenuating the light beam as claimed in claim 11 wherein the step of positioning of said light vane further comprises the step of controlling placement of said light vane by specifying a position ranging from said zero stop position to said full stop position for said light vane.

15. The method for attenuating the light beam as claimed in claim 14 wherein the step of controlling placement of said light vane further comprises the step of positioning said light vane in discrete positions so as to attenuate said cone shaped light beam in f-stop increments.

* * * * *